July 23, 1963
F. C. MELCHIOR
3,098,389
SUBMARINE SURFACE SENSING SYSTEM
Filed Dec. 22, 1961
4 Sheets-Sheet 1
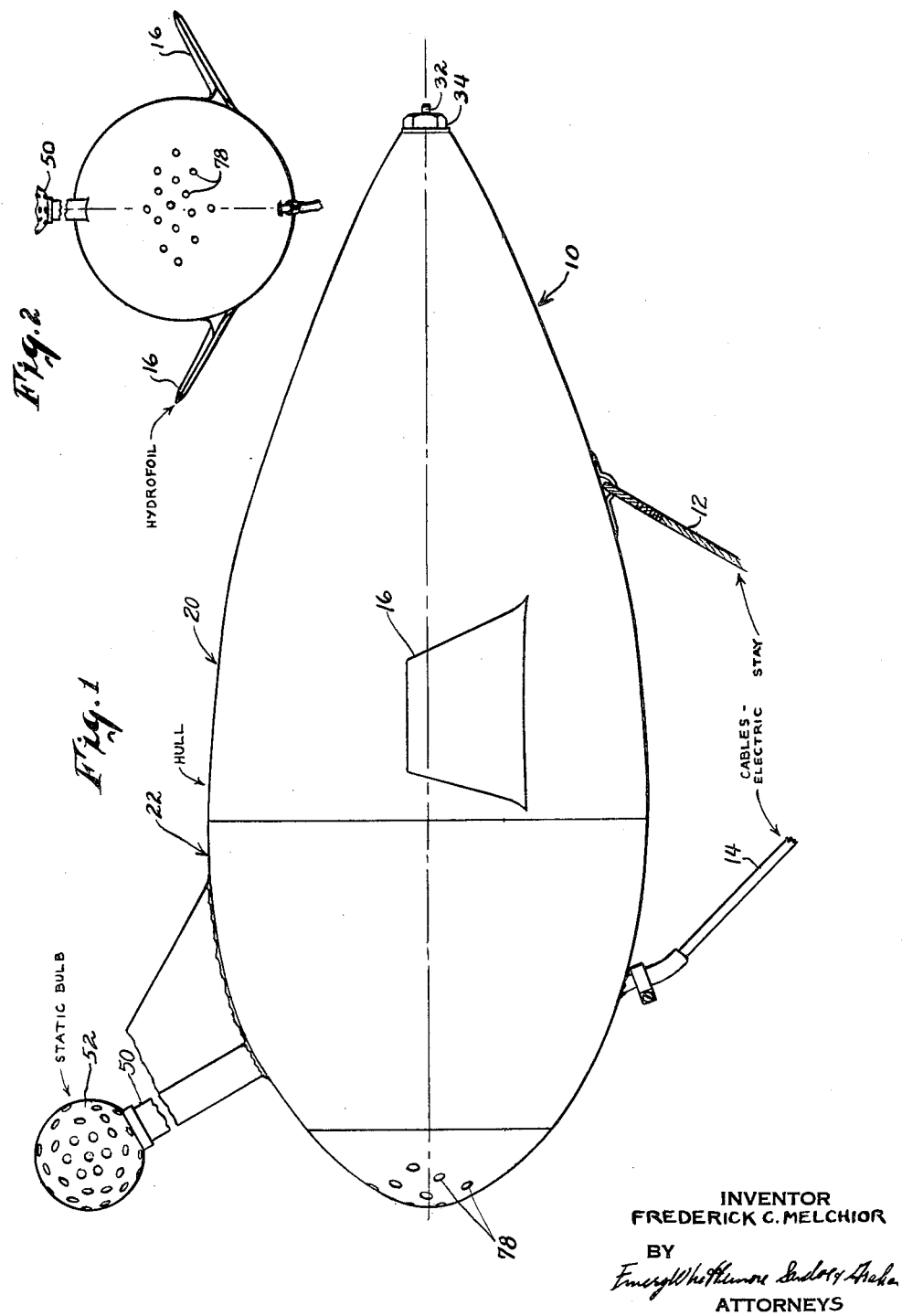
INVENTOR
FREDERICK C. MELCHIOR
BY
ATTORNEYS

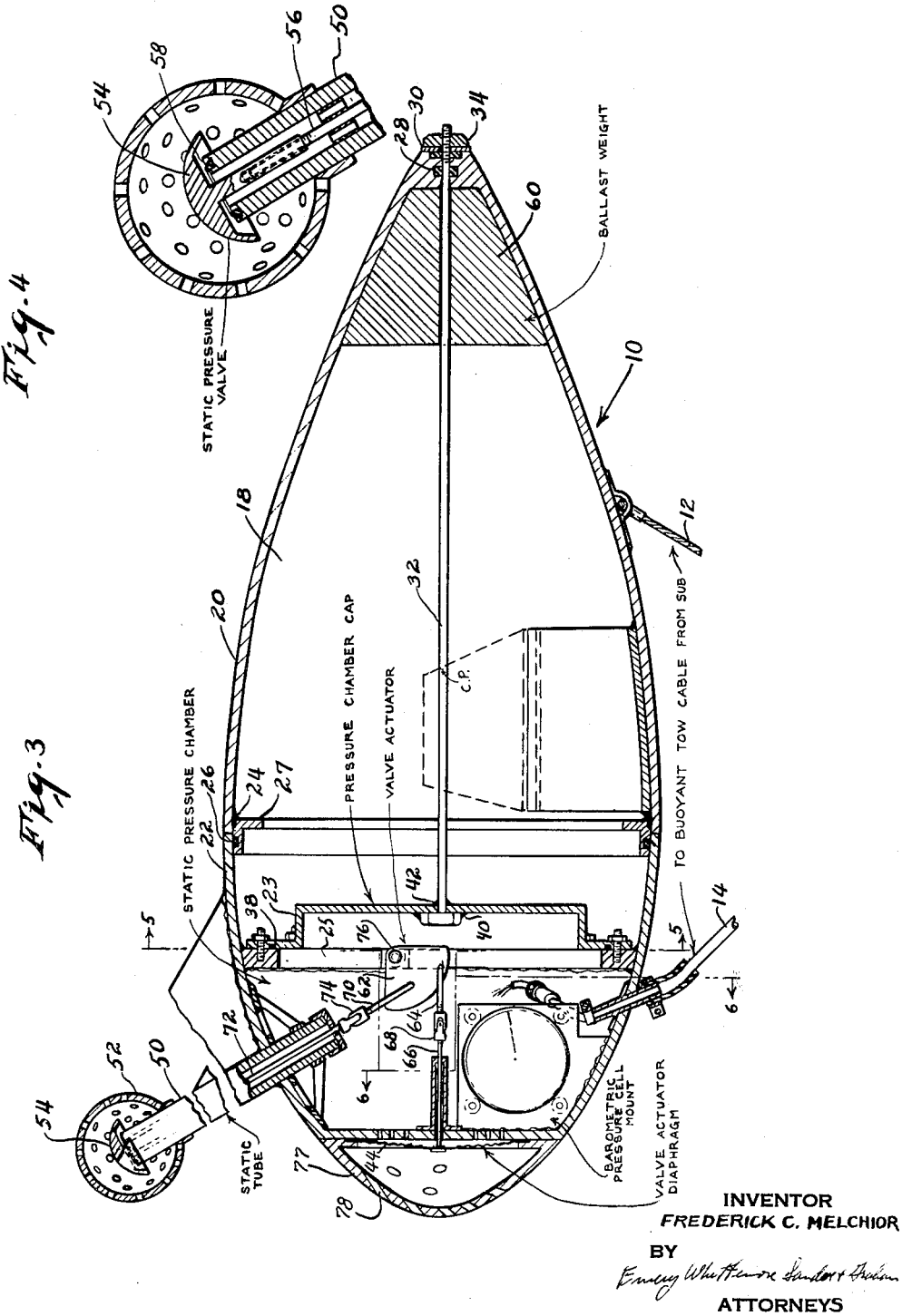

July 23, 1963   F. C. MELCHIOR   3,098,389
SUBMARINE SURFACE SENSING SYSTEM
Filed Dec. 22, 1961   4 Sheets-Sheet 3
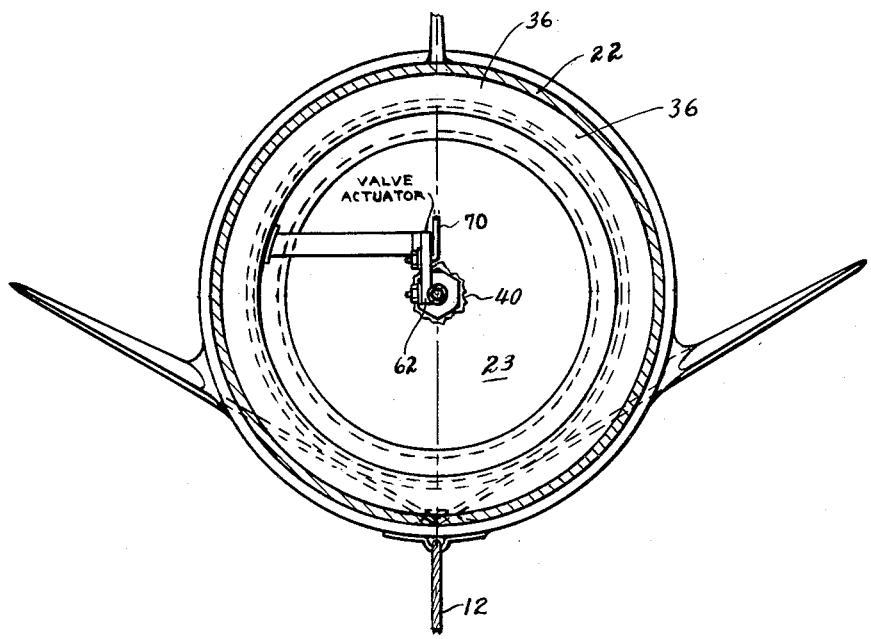
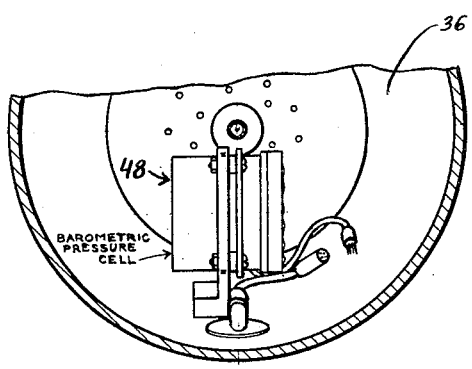
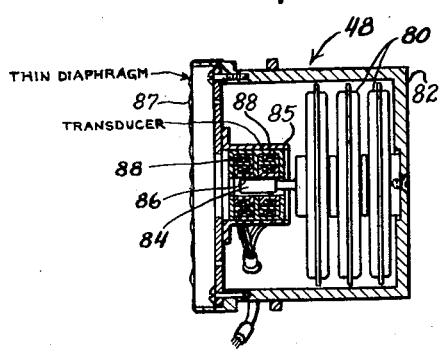
INVENTOR
FREDERICK C. MELCHIOR
BY
ATTORNEYS July 23, 1963 F. C. MELCHIOR 3,098,389
SUBMARINE SURFACE SENSING SYSTEM
Filed Dec. 22, 1961 4 Sheets-Sheet 4
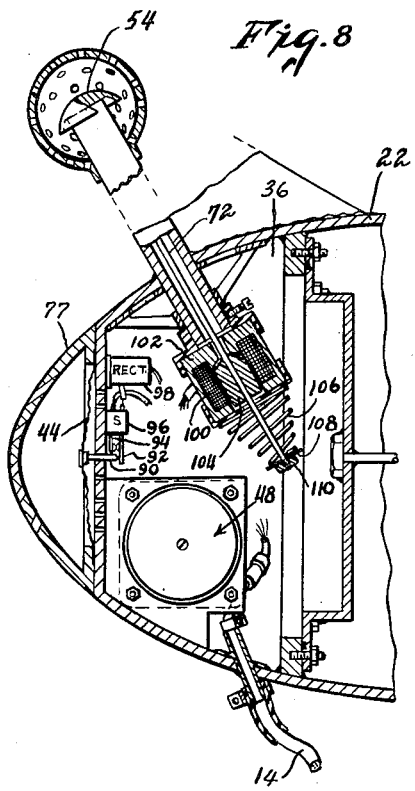
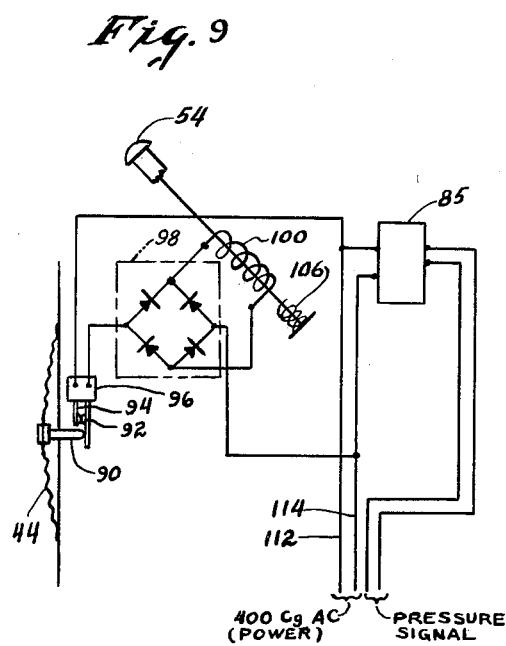
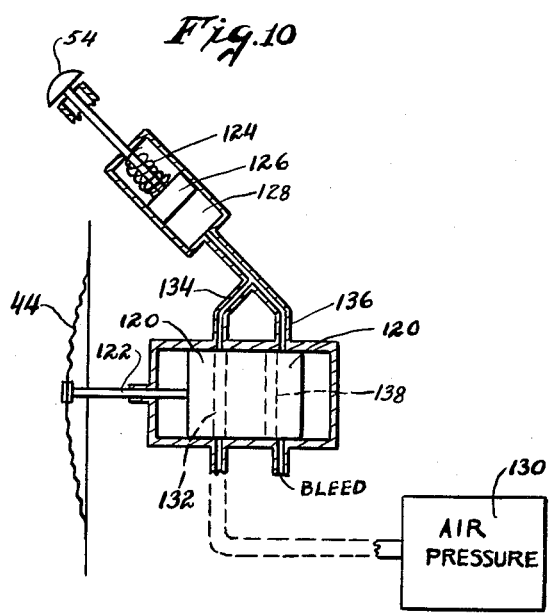
INVENTOR.
FREDERICK C. MELCHIOR
BY
ATTORNEYS United States Patent Office 3,098,389
Patented July 23, 1963

3,098,389
SUBMARINE SURFACE SENSING SYSTEM
Frederick C. Melchior, 258 Riverside Drive,
New York, N.Y.
Substitute for abandoned application Ser. No. 15,669, Mar. 17, 1960. This application Dec. 22, 1961, Ser. No. 163,957
9 Claims. (Cl. 73—384)

This invention relates to submarine instrumentation and, more particularly, relates to an improved means for the determination of significant surface meteorological conditions by a vessel or a station hovering or moving below the surface.

Modern submarines have greatly increased range and performance capabilities than predecessor submarines and require concomitant improvement in the performance of the control and indicating instruments. For example, it is desired that measurement of depth be accurate to ±6 inches. Whether such accuracy is required to order to surface the submarine (equivalent to landing of an aircraft on the ground with the modern high speed vessels) or for use during maneuvering is neither known by the applicant nor is it of concern to this application.

While it appears possible to build depth gauges having the requisite accuracy under laboratory conditions, it must be noted that the accuracy of depth measurement will depend upon surface conditions since the depth gauge measures the pressure of the water column and the atmosperic column. Since atmospheric pressure changes greater than an equivalent 6 inches of water may be encountered, the surface pressure must be determined for accuracy of depth measurement. For example, a change of barometric pressure at the surface of one inch of mercury (equivalent to 13.5 inches of water) would cause a change in depth measurement of 13.5 inches without actual change in the depth of the submarine. Thus, accuracies in depth measurement of the order desired can be accomplished only if the surface conditions are known.

With predecessor submarines, local barometric pressure was obtainable from an area command and this information was usable over a considerable period. However, with the range and speed of the modern submarine, it has become an entity for strategic purposes and must exist without the aid of information and guidance supplied by an area command. Thus, on long range, independent missions, it will be necessary for the submarine to itself acquire accurate, up-to-date meteorological information.

This information and, particularly, the two critical factors of barometric pressure at sea level and measurement of the height of sea level waves should be obtainable without the surfacing and the concomitant exposure of the submarine to detection and possible attack.

It is, therefore, the primary object of this invention to provide an improved method and means for the sensing, indicating and recording of conditions prevailing at sea level from the submerged vessel.

It is a further object of this invention to provide an improved method and means for the detection of surface barometric pressure from a submerged vessel.

In accordance with these objects there is provided, in a preferred embodiment of this invention, a sensing unit comprising a buoyant body which can be released from a submerged vessel or station. The sensor is held captive by a cable and is provided with hydrofoils to stabilize the body when towed by the submarine. Contained within the body is a barometric sensing unit comprising pressure sensitive capsules, which deflect in accordance with the measured ambient barometric pressure.

A selectably sealed static tube extends from the body to couple the pressure sensitive capsules to the ambient pressure as desired. The static tube position and the body flotation position are such as to ensure that the end of the static tube is the highest part of the sensing mechanism thereby avoiding the entry of water into the tube.

In order to open the static tube when above water and to close the tube when below the water, there is provided in the body of the sensing unit, a diaphragm deflected by water pressure. Means are provided to open and seal the static tube in response to diaphragm deflection.

Means are provided to generate an electric signal the amplitude of which is responsive to the ambient barometric pressure measured by deflection of the aneroid capsules. The electric signal amplitude is then transmitted to the submarine for compensation of the depth gauges contained therein for changes in ambient barometric pressure.

This invention will be more readily understood by reference to the accompanying description taken in combination with the accompanying drawings, of which:

FIG. 1 is a side elevation of the floatable sensing unit;
FIG. 2 is a front elevation of the unit shown in FIG. 1;
FIG. 3 is a cross sectioned view of one embodiment of the unit shown in FIG. 1;
FIG. 4 is a cross sectioned view, to enlarged scale, of a portion of the apparatus shown in FIG. 3;
FIG. 5 is a cross section view taken along lines 5—5 of FIG. 3;
FIG. 6 is a cross section view taken along lines 6—6 of FIG. 3;
FIG. 7 is a cross sectioned view of the pressure responsive capsules in the unit shown in FIG. 1;
FIG. 8 is a cross sectioned view of a portion of the unit shown in FIG. 1 in accordance with another embodiment of this invention;
FIG. 9 is a schematic diagram of the unit shown in FIG. 8; and
FIG. 10 is a cross sectioned view of a portion of the unit shown in FIG. 1 in accordance with another embodiment of this invention.

In FIGS. 1–7 there is shown one embodiment of this sensing unit in accordance with this invention comprising a buoyant body 10 which can be selectably allowed to rise to the surface from a submerged station such as a submarine. The body can be retracted from the surface by means of the cables 12 and 14 and can be towed along the surface by means of the cables.

To ensure stability and proper positioning of the unit during towing there are provided hydrofoils 16 each having a pronounced dihedral.

The unit is provided with a central watertight, hollow cavity 18 defined by the aft body portion 20, forward body portion 22 and pressure chamber cap 23. The body portions are formed with circular cross sections to provide strength to resist high pressures and wave impacts with a light structure. Reinforcing rings 25 and 27 are welded to the body by peripheral welds 24. The body shape provides both adequate displacement for buoyancy and excellent streamlining. The cavity 18 is sealed by gaskets 26, 28 and 30 to ensure exclusion of water therefrom, and, thus, to ensure buoyancy. The body portions are secured by an axially extending tie rod 32 and nut 34. The tie rod is welded to cap 23 by peripherally extending weld beads 40 and 42.

At the forward end of the unit there is provided a static pressure chamber 36 defined by the forward body portion 22 and the pressure chamber cap 23. The static pressure chamber is isolated from the flotation cavity 18 by gasket 38. Entry of water is prevented by diaphragm 44.

The pressure chamber 36 contains the pressure responsive sensor 48 and communicates with the atmosphere through static tube 50. The static tube 50 terminates in a static bulb 52 and is provided with a selectably operated seal or valve. The valve 54 is operated by shaft 56 to open the tube and to selectably seal the tube by moving the valve 54 into sealing engagement with gasket 58.

Since it is desirable that the static bulb be the highest part of the unit, a ballast weight 60 is provided. Thus, when the unit is still, the unit will assume a nose-up position. When moving, the foil surfaces will cause the unit to assume the proper position with the static tube erected.

To selectably open the static tube to the atmosphere, the valve actuator diaphragm 44 is coupled to the valve actuator plate 62 through the tie rods 64, 66 and universal joint 68. Similarly valve 54 is coupled to the plate 62 through the rods 70, 72 and universal 74. The plate is pivotally mounted on pin 76 and is moved to open the valve 54 by the spring action of diaphragm 44. When the unit is submerged, the water pressure will overcome the spring of the diaphragm, closing valve 54. A nose cap 77 is provided having perforations 78 therethrough to admit water for diaphragm operation but preventing erratic diaphragm deflection by impinging waves.

Thus, the unit will remain sealed until it reaches the surface at which time it will operate to open the pressure chamber to the atmosphere. The pressure responsive element will then measure the ambient barometric pressure.

The pressure responsive element comprises stacked aneroid capsules 80 joined at their central hubs. Each of the capsules are preferably of the concentrically corrugated type described in Melchior Patent 2,760,260. One end of the capsule stack is affixed to the end wall of housing 82; the other end carries a ferromagnetic armature 84, such as a soft iron slug. The slug is moved within a detector 85 which comprises a balanced transformer. Movement of the slug changes the coupling between the primary 86 and secondary windings 88. The primary windings are energized with an alternating signal. The secondaries are connected in phase opposition so that the movement of the slug from the null position will result in an output signal, the amplitude of which will be related to the amplitude of displacement and the phase of which will be related to the direction of movement of the slug.

The signal generated by the sensor is transmitted to the submarine over cable 14. The signal, suitably calibrated from a null position corresponding to a preselected barometric pressure, can thus be directly used in the submarine. It is usually more expedient to set the null position outside of the operating range of pressures. By so doing, the signal will vary only in amplitude and a simple voltage response instrument may be employed in the submarine. If the null position is within the operating range, the submarine display must be phase sensitive.

By using capsules manufactured in accordance with U.S. Patent 2,760,260, Melchior, a minimum practical accuracy of 1 part in 3000 is attainable. Since the pressure range to be measured is 3" Hg, an accuracy of better than 1 ft. of altitude at sea level is attainable.

With such measurement accuracy it will be noted that the height of waves and the period may be easily determined by recording the signal, as for example on a moving strip record. The average of the signal can be used for pressure measurement and the signal variation used for wave measurement.

A thin nonelastic diaphragm 87 seals the unit 82 from entry of water but transmits pressure without change.

In many applications, it is desirable to eliminate the requirement that the diaphragm do the work necessary to open and shut the valve mechanically. In such cases the embodiment shown in FIGS. 8 and 9 may advantageously be employed.

In FIGS. 8 and 9 there is shown the static pressure chamber 36 of the unit in which is mounted the barometric pressure cells 48. The actuated diaphragm 44 reciprocally moves plunger 90 dependent on the existence of water within the nose cap 77. The plunger 90 operates to open and close the contacts 92 and 94 of switch 96.

Since an alternating voltage is transmitted to the sensing unit, it is advantageous to rectify the voltage by rectifier bridge 98 and apply the signal to the coils 100 of solenoid 102 when the switch contacts 92 and 94 of switch 96 are closed. In this manner need for a separate power source is eliminated.

The valve 54 is operated by movement of rod 72 coupled to the armature 104 of the solenoid. The valve is held shut when the solenoid is not energized through the operation of spring 106 in urging engagement with washer 108 affixed to the end of rod 72 by nut 110.

It will be noted that the arrangement is fail-safe since upon failure of the power source or of the switch 96, the valve will fail in the closed position. As shown specifically in FIG. 9, power applied over leads 112 and 114 is rectified by the conventional bridge circuit 98 and selectably applied to the solenoid coils 100 through the switch contacts 92 and 94.

In some applications, it may be desirable to eliminate the operating solenoid, such as, for example to eliminate the associated magnetic fields. In such applications the embodiment shown in FIG. 10 may advantageously be employed. In FIG. 10 there is shown the diaphragm 44 which reciprocates valve 120 by means of coupling rod 122 in accordance with deflection of the diaphragm under water pressure. The valve 54 is operated against the force of spring 124 by a piston 126 movable within cylinder 128. A source of air pressure, such as a bottle of compressed air, 130 is provided and is coupled to the cylinder 128 through valve bore 132 and piping 134. When the unit is submerged, water pressure will move the diaphragm to cut off the supply of air pressure to the cylinder 128 and to simultaneously bleed the cylinder of air pressure therein via pipe 136 and valve bore 138.

This invention may be variously embodied and modified within the scope of the subjoined claims.

What is claimed is:

1. A buoyant sensing unit adapted for flotation on the surface of water comprising a barometric sensor to measure barometric pressure at the water surface, said sensor being housed within said unit, and means responsive to water pressure on the unit when submerged in said water to seal said unit, said last named means including a valve.

2. A buoyant sensing unit in accordance with claim 1 which includes means to transmit the sensor deflection to a submerged station.

3. A sensing unit in accordance with claim 1 in which said valve is movable from an open to a closed position and in which said pressure responsive means includes a diaphragm deflectable by water pressure, and means responsive to said diaphragm deflection for moving said valve from the open to the sealed position.

4. A sensing unit in accordance with claim 3 in which said diaphragm responsive means comprises a solenoid, and switch means responsive to diaphragm deflection for energizing said solenoid.

5. A sensing unit in accordance with claim 1 which includes cable means coupled between said sensing unit and a submerged station, and hydrofoils affixed to said unit to stabilize said unit during towing.

6. A sensing unit in accordance with claim 1 in which said barometric sensor comprises stacked aneroid capsules, said capsule stack being mounted at one end thereof with the other end free to move in accordance with expansion and contraction of said stack, an armature coupled to said movable end to move in accordance with changes in barometric pressure, and means to generate an electric signal responsive to armature position.

7. A sensor in accordance with claim 6 which includes means to transmit said signal to a submerged station.

8. A system for the detection of surface conditions from a submerged station comprising a buoyant body having a pressure chamber therein, valve means for sealing said chamber, a barometric pressure sensor positioned within said chamber, cable means to couple said body to said station at a selectable distance, means responsive to water pressure to maintain said valve closed when the body is submerged, means to open said valve when the body is at the surface to couple said chamber to the atmospheric pressure, means responsive to sensor deflection to generate a signal, means to transmit said signal to said station, and indicator means within said station responsive to said signal to indicate surface conditions.

9. A system in accordance with claim 8 in which said indicator comprises means for recording said signal.

References Cited in the file of this patent
UNITED STATES PATENTS

| | | |
|---|---|---|
| 651,260 | McGray | June 5, 1900 |
| 2,265,098 | Bettis | Dec. 2, 1941 |
| 2,592,159 | Klebbo et al. | Apr. 8, 1952 |